US012706747B2

(12) United States Patent
Rik

(10) Patent No.: US 12,706,747 B2
(45) Date of Patent: Aug. 11, 2026

(54) METHOD FOR RESPONDING TO PUBLISHED CONTENT, METHOD FOR ASSESSING A RESPONSE TO PUBLISHED CONTENT, COMPUTER PROGRAMS, NON-TRANSITORY MACHINE-READABLE MEDIA, AND APPARATUSES THEREFOR

(71) Applicant: Sony Group Corporation, Tokyo (JP)

(72) Inventor: Claesen Rik, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 86 days.

(21) Appl. No.: 18/708,279

(22) PCT Filed: Aug. 18, 2022

(86) PCT No.: PCT/EP2022/073089

§ 371 (c)(1),
(2) Date: May 8, 2024

(87) PCT Pub. No.: WO2023/099049

PCT Pub. Date: Jun. 8, 2023

(65) Prior Publication Data

US 2025/0016000 A1 Jan. 9, 2025

(30) Foreign Application Priority Data

Dec. 1, 2021 (EP) .................................... 21211600

(51) Int. Cl.
*H04L 9/32* (2006.01)

(52) U.S. Cl.
CPC ................................. *H04L 9/3218* (2013.01)

(58) Field of Classification Search
CPC .................................................... H04L 9/3218
See application file for complete search history.

(56) References Cited

U.S. PATENT DOCUMENTS

2019/0097812 A1 3/2019 Toth
2020/0403795 A1* 12/2020 Murdoch ................ H04L 9/321
2021/0049710 A1 2/2021 Haywood (Continued)

OTHER PUBLICATIONS

International Search Report and Written Opinion mailed on Dec. 9, 2022, received for PCT Application PCT/EP2022/073089, filed on Aug. 18, 2022, 11 pages.

(Continued)

*Primary Examiner* — Hee K Song

(57) ABSTRACT

The present disclosure provides a method for responding to published content, a method for assessing a response to published content, computer programs, non-transitory machine-readable media, and apparatuses therefor. The method for responding to published content comprises generating, based on one or more unique verifiable credential of a first digital identity and information related to a second digital identity, a cryptographic proof for proving that the first digital identity is holder of the one or more unique verifiable credential. The cryptographic proof is indicative of the second digital identity and a hash value of the one or more unique verifiable credential. Further, the method comprises outputting data indicative of a response to the published content together with the cryptographic proof and the hash value.

19 Claims, 2 Drawing Sheets

(56) References Cited

U.S. PATENT DOCUMENTS

| | | | |
|---|---|---|---|
| 2021/0089676 | A1 | 3/2021 | Ford et al. |
| 2021/0150515 | A1 | 5/2021 | Lu et al. |

OTHER PUBLICATIONS

Bandara et al, "A Blockchain and Self-Sovereign Identity Empowered Digital Identity Platform", 2021 International Conference on Computer Communications and Networks (ICCCN), Jul. 19, 2021, 7 pages.

"Verifiable Credentials Data Model 1.0", Retrieved from Internet: https://www.w3.org/TR/vc-data-model/#proofssignatures, Aug. 2, 2021, pp. 1-122 pages.

* cited by examiner

METHOD FOR RESPONDING TO PUBLISHED CONTENT, METHOD FOR ASSESSING A RESPONSE TO PUBLISHED CONTENT, COMPUTER PROGRAMS, NON-TRANSITORY MACHINE-READABLE MEDIA, AND APPARATUSES THEREFOR

CROSS-REFERENCE TO RELATED APPLICATIONS

This application is a national stage application, pursuant to 35 U.S.C. § 371, of International Patent Application No. PCT/EP2022/073089, filed Aug. 18, 2022, which claims priority from European Patent Application No. 21211600.8, filed Dec. 1, 2021, the entire contents of each are incorporated herein by reference.

FIELD

The present disclosure relates to an approach for proving/verifying the authenticity of a response to published content. In particular, examples of the present disclosure relate to a method for responding to published content, a method for assessing a response to published content, computer programs, non-transitory machine-readable media, and apparatuses therefor.

BACKGROUND

Social media or other interactive online platforms provide response or reaction mechanisms which allow users to respond to content, e.g., by submitting ratings, comments, so-called "likes", or other types of responses/reactions. A problem is that a human/person or a nonhuman entity can submit multiple responses to the same content, e.g., using several aliases, accounts and/or email addresses which makes the responses inauthentic. Response mechanisms based on such potentially unauthentic responses are not reliable.

Hence, there may be a demand for improved online interaction, in particular, for responding to published content and assessing responses to published content.

SUMMARY

This demand may be satisfied by the subject-matter of the appended independent and dependent claims.

Embodiments of the present disclosure provide a method for responding to published content. The method comprises generating, based on one or more unique verifiable credential of a first digital identity and information related to a second digital identity, a cryptographic proof for proving that the first digital identity is holder of the one or more unique verifiable credential. The cryptographic proof is indicative of the second digital identity and a hash value of the one or more unique verifiable credential. Further, the method comprises outputting data indicative of a response to the published content together with the cryptographic proof and the hash value.

The cryptographic proof and the hash value allow the first digital identity to prove the authenticity/genuineness of the response, i.e., that the response, e.g., is from a real person and/or that the person with the first digital identity responded only once or only as often as allowed. So, the method enables reliable and discreet response mechanisms for users which do not require the users to reveal the verifiable credential.

Respectively, the method allows a recipient to verify the authenticity of the response.

Other embodiments provide a method for assessing a response of a first digital identity to published content of a second digital identity. The method comprises receiving data indicative of the response to the published content. The method further comprises receiving a hash value of one or more unique verifiable credential of the first digital identity. Also, the method comprises receiving a cryptographic proof for proving that the first digital identity is holder of the one or more unique verifiable credential, wherein the cryptographic proof is indicative of the second digital identity and the hash value. Assessing the data based on the cryptographic proof and the hash value.

In practice, the method for assessing the response can be deployed complementary to the method for responding to published content. Explanations regarding the methods, thus, may be equally applied to both of the methods and their features.

As the skilled person will understand, complementary to the method for responding to published content, the method for assessing the response, e.g., allows to verify whether the response is submitted by a human/person and/or whether the same digital identity already responded to the same content and, thus, enables more reliable reaction mechanisms.

Further embodiments provide a computer program having a program code for performing a method proposed herein, when the program is executed on a processor or a programmable hardware.

Other embodiments provide a non-transitory machine-readable medium having stored thereon a program having a program code for performing one of the methods proposed herein, when the program is executed on a processor or a programmable hardware.

Still other embodiments provide an apparatus for responding to published content. The apparatus comprises one or more interface for communicating and processing circuitry configured to generate, based on one or more unique verifiable credential of a first digital identity and information related to a second digital identity, a cryptographic proof for proving that the first digital identity is holder of the one or more unique verifiable credential. The cryptographic proof is indicative of the second digital identity and a hash value of the one or more unique verifiable credential. The processing circuitry is further configured to output, using the one or more interfaces, data indicative of a response to the published content together with the cryptographic proof and the hash value.

Further embodiments provide an apparatus for assessing a response of a first digital identity to published content of a second digital identity. The apparatus comprises one or more interface for communicating and processing circuitry configured to receive, using the one or more interface, data indicative of the response to the published content. Also, the processing circuitry is configured to receive, using the one or more interface, a hash value of one or more unique verifiable credential of the first digital identity and to receive, using the one or more interface, a cryptographic proof for proving that the first digital identity is holder of the one or more unique verifiable credential. The cryptographic proof is indicative of the second digital identity and the hash value. Further, the processing circuitry is configured to assess the data based on the cryptographic proof and the hash value.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
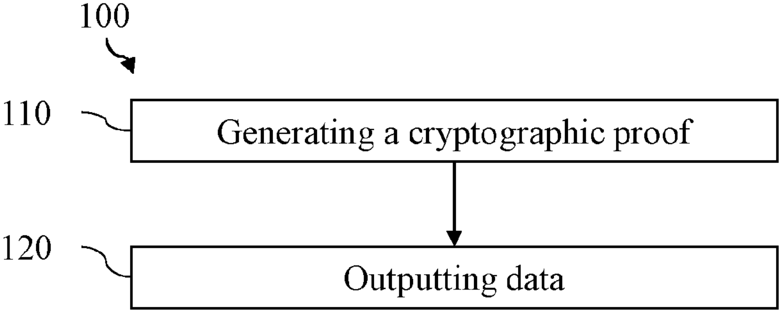
FIG. 1 illustrates a flow chart schematically illustrating an embodiment of a method for responding to published content.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a flow chart of an embodiment of a method 100 for responding to published content. Method 100 comprises generating 110, based on one or more unique verifiable credential of a first digital identity and information related to a second digital identity, a cryptographic proof for proving that the first digital identity is holder of the one or more unique verifiable credential. The cryptographic proof is indicative of the second digital identity and a hash value of the one or more unique verifiable credential.

Further, method 100 comprises outputting 120 data indicative of a response to the published content together with the cryptographic proof and the hash value.

In this way, a person with the first digital identity can prove the authenticity of his/her response.

So, embodiments of the present disclosure are based on the finding that verifiable credentials can be used for proving and assessing the genuineness or authenticity, e.g., that responses are from a real human and multiple responses are not from the same human. To this end, e.g., verifiable credentials issued by a public digital identity which include SSI Avatars can be used to build zero-knowledge proofs with or without selective disclosure of attributes on the verifiable credentials to prove the authenticity of responses of the public digital identity. In this way, any party, entity, or person receiving such a proof can verify the authenticity using the public decentralized identifier (DID) of the public digital identity, whose public DID and DID document, by their nature, is stored together with public keys on a public ledger. However, this may not work for credentials issued by a private individual because their DID and DID document with public key are not registered on a public ledger. Method 100 also allows a private digital identity, e.g., a private self-sovereign identity, or a private/individual person with such an identity to prove the authenticity of the response without revealing its DID. So, method 100 not only allows public digital identities (e.g., public self-sovereign identities) but also private self-sovereign identities to prove the authenticity of their responses. In other words, it allows a recipient of the cryptographic proof and the hash value to verify the authenticity of the data/response without the DID of the responding identity.

In context of the present disclosure, the person can be a natural person (human) or a legal person (e.g., an association or a company).

In practice, method 100 may be executed on an apparatus or device, e.g., a personal computer, a mobile phone or any other programmable hardware of the person.

The first and the second digital identity can be understood as a digital representation of the person. In practice, the first and/or the second digital identity can be online identities or so-called "self-sovereign identities". Optionally, also other types of digital representation can be used. The identities can have one or more attributes which, e.g., comprise the age, the sex, the date of birth, and/or other personal information on the person associated with the respective digital identity.

The published content can be any digital content on an interactive public or private (social) platform. In practice, the published content can comprise or correspond to an account, a profile, a post, a comment, a message, a video, an electronic/digital poll, a video, a picture, or the like on such a platform. In embodiments, the person with the second digital identity may have published the digital content, i.e., made the content available via such a platform for at least one other person to respond to the content. The data indicative of the response can comprise or correspond to a reaction, a rating, a comment, a vote, or the like. Interactive platforms, e.g., are or comprise social media networks, electronic messengers, chat rooms, poll platforms or any other platforms which allow users to respond to its content.

The unique verifiable credential (VC) may represent information found in physical credentials of the person with the first digital identity, such as a passport or license, as well as information that have no physical equivalent, such as information on a commercial register entry or ownership of a bank account. The unique verifiable credential can be digitally signed, which makes it tamper-resistant and verifiable. To be unique, the unique verified credential can be indicative or representative of unique information or a unique combination of information about a person associated with the first digital identity, such as a unique passport number or unique biometric information. The unique verifiable credential, e.g., is based on the data model or standard for verifiable credentials of the World Wide Web Consortium (W3C). In practice, the unique verifiable credential can be issued by and/or received from a trusted authority, e.g., the government or a government agency.

The hash value can be understood as an encrypted form of the unique verifiable credential and can be generated using a hash function with the unique verifiable credential as input to the hash function.

The information related to the second digital identity can be or comprise information on the person with the second digital identity and/or the content published by that person. In practice, the information may comprise an identifier of the person, of the second digital identity, or of the content (e.g., a tag or number of the content). In some embodiments, the information related to the second digital identity can be a DID of the second digital identity. The DID, e.g., complies with a standard for DIDs of the W3C.

The cryptographic proof, e.g., is or comprises a zero-knowledge proof with selective disclosure that (only) reveals the hash value and not the plaintext of the unique verifiable credential. In this way, the cryptographic proof can prove that the first digital identity is holder of the one or more unique verifiable credential while keeping the unique verifiable credential secret, i.e., while not revealing the plaintext of the unique verifiable credential. To this end, the cryptographic proof is configured such that it confirms that the hash value, which it reveals, belongs to an actual unique verifiable credential and that the first digital identity is holder of the unique verifiable credential. In this way, it can be proven that the hash value actually belongs to a valid unique verifiable credential and made sure that no arbitrary hash value not related to an actual verifiable credential is used instead.

The skilled person having benefit from the present disclosure will appreciate that the cryptographic proof can also comprise or correspond to a bullet proof, a predicate proof, a ring signature, or the like.

For generating 110 the cryptographic proof, an appropriate generation routine/program with the information related to the second digital identity and the unique verifiable credential and/or the hash value thereof as input to the routine can be used. For the cryptographic proof to be indicative of the second digital identity, it can indicate at least a portion of the information related to the second digital identity or information derived from the information related to the second digital identity. Since the cryptographic proof is indicative of the second digital identity, it cannot be reused or misused for responses of other entities.

By outputting 120 the data, the cryptographic proof and the hash value is made available for at least one recipient. In applications, the recipient can be the person with the second digital identity and/or a third party interested in the authenticity of the data/response.

A basic idea of the present disclosure is that the recipient having available the hash value and information which the cryptographic proof indicates about the second digital identity, can verify through comparison with the cryptographic proof that the hash value belongs to an actual unique verifiable credential, that the data/response is from the (legitimate) holder of the unique verifiable credential and that the data/response is directed to the second digital identity and/or its content.

As the cryptographic proof is generated based on the unique verifiable credential, the cryptographic proof may be individual for the first digital identity because others, who do not have the unique verifiable credential of the first digital identity, may not be able to reproduce the cryptographic proof.

Figure 2:
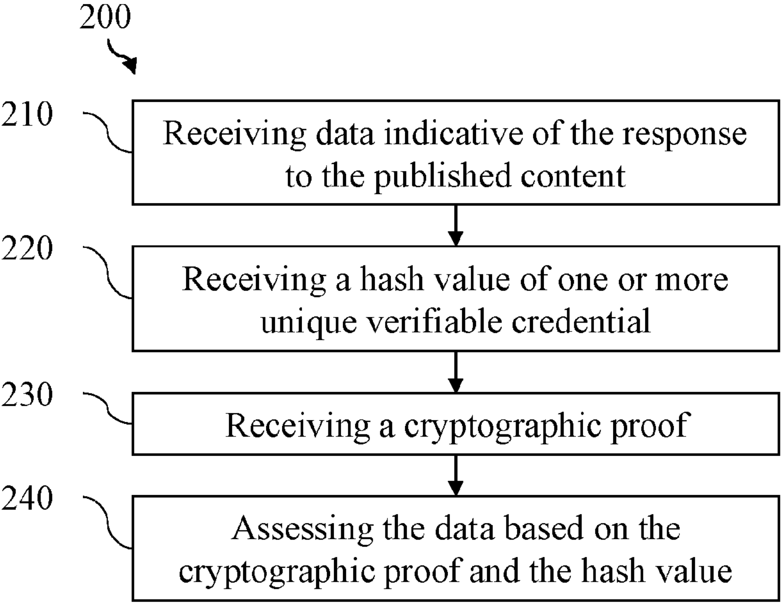
FIG. 2 illustrates a flow chart schematically illustrating an embodiment of a method for assessing a response of a first digital identity to published content of a second digital identity.

In this way, method 100 allows a recipient of the output to verify the authenticity of the data/response by means of a respective method, as laid out in more detail with reference to FIG. 2.

FIG. 2 illustrates a flow chart of an embodiment of a method 200 for assessing a response of a first digital identity to published content of a second digital identity.

Method 200 comprises receiving 210 data indicative of the response to the published content and receiving 220 a hash value of one or more unique verifiable credential of the first digital identity. Further, method 200 comprises receiving 230 a cryptographic proof for proving that the first digital identity is holder of the one or more unique verifiable credential. The cryptographic proof is indicative of the second digital identity and the hash value. The data, the hash value, and the cryptographic proof, in practice, may be received via the Internet or a local network.

Method 200 also comprises assessing 240 the data based on the cryptographic proof and the hash value.

In embodiments, method 200 can be executed on an apparatus or a device of the person with the second digital identity or of a third party (verification service). The third party can be interactive platform publishing the content of the second digital identity or another entity questioning the authenticity of the data/response.

For assessing 240 the data, information about the second digital identity and the hash value can be compared with the cryptographic proof to verify that the hash value belongs to an actual unique verifiable credential and that the data/response is from the (legitimate) holder of this unique verifiable credential. The data/response, e.g., is considered authentic if the information about the second digital identity and the hash value matches what the cryptographic proof indicates about the second digital identity and the hash value for which the cryptographic proof confirms that it is based on an actual unique verifiable credential of the first digital identity. Otherwise, if they differ, the data/response, e.g., is considered inauthentic.

In this way, method 200 allows for verifying the authenticity of responses. In practice, method 100 and 200, e.g., can be both applied in reaction mechanisms for authentic interactions between users on social platforms or the like.

In some embodiments, method 200 also allows to proof the authenticity of the data/response to other entities. For this, method 200, e.g., comprises forwarding the hash value and the cryptographic proof to circuitry of a third-party verification service and requesting verification that the first digital identity is holder of the one or more unique verifiable credential.

In applications, it is also desired by the recipient to proof the authenticity to another person/party, in particular, that it came from an existing person and that multiple responses of the same person are exposed as such. In this way, it can be proven that the responses to a certain individual, topic, content, service, or company was received from unique entities, e.g., that 1000 "likes" or comments came from 1000 individual entities. To this end, predefined deterministic functions for generating the hash value and a predefined type of verifiable credential may be determined. As the skilled person having benefit from the present disclosure will appreciate, deterministic functions (always) output the same hash value for the same input. That is, when using a predefined deterministic function for generating the hash value, the hash value consistently will be the same for the same unique verifiable credential as input to the hash function. Consequently, the recipient will receive the equal hash values in case of multiple responses from the same person (using the same unique verifiable credential) and, thus, is able to detect multiple responses from the same person. To this end, method 200 comprise storing the hash value. Further, method 200 may comprise receiving other data together with a further hash value obtained from one or more unique verifiable credential of a third digital identity and assessing the other data based on a comparison of the stored hash value and the further hash value. Assessing the other data, e.g., comprises assessing whether the data and the other data is from the same person. This allows, e.g., that if so, only the data or the other data is considered in further processing and, so, only one response per person is considered. In this way, it can be ensured that only one or a predefined number of reactions per user are considered.

In the following, embodiments of method 100 and 200 are described in more detail with reference to an exemplary use case schematically shown in FIG. 3.

Figure 3:
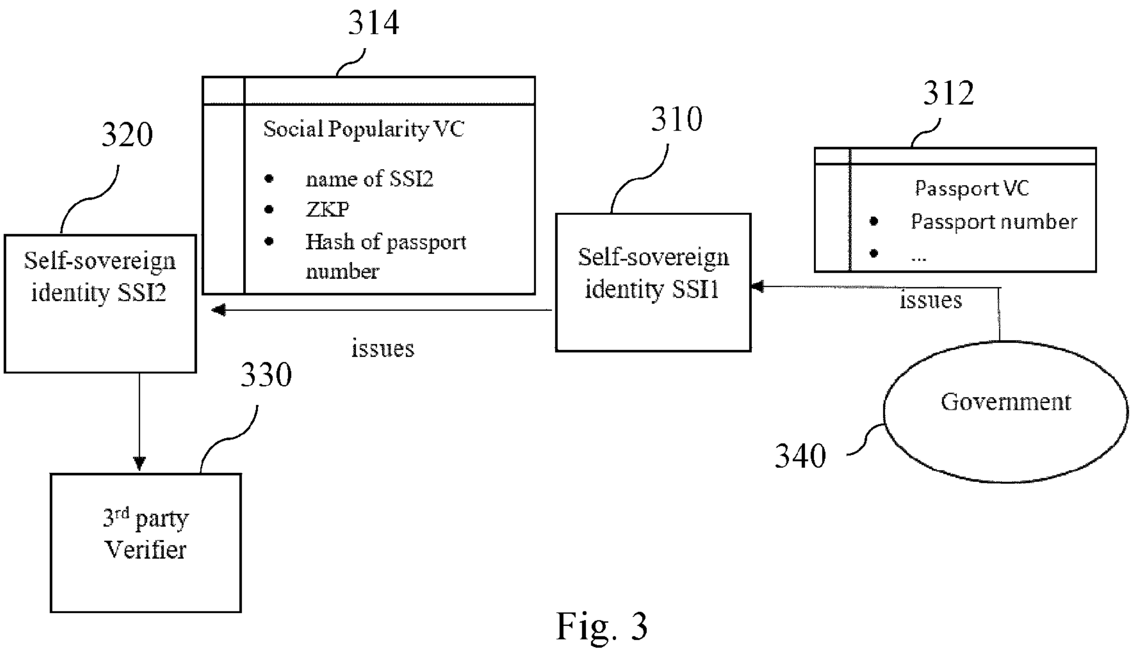
FIG. 3 illustrates a block diagram schematically illustrating an application of the proposed methods.

FIG. 3 illustrates a block diagram schematically illustrating an application of the proposed methods.

The application, e.g., is a reaction mechanism for interactive platforms which allows a first person 310 with a first digital identity to submit a response to content of a second person 320 with a second digital identity. For example, the first person wants to respond to or "like" the second person or a respective account of the second person. In this context, e.g., an account or the digital identity of person 310 may be understood as the published content.

The first digital identity is a first self-sovereign identity and the second digital identity is a second self-sovereign identity.

The first self-sovereign identity 310 receives a passport verifiable credential 312 issued by a generally accepted issuer, e.g., a governmental agency 340. The passport verifiable credential 312 can be understood as a digital equivalent of a physical passport of the first self-sovereign identity. Accordingly, the passport VC, e.g., indicates a unique verifiable credential in the form of a respective unique passport number.

According to method 100, the first person 310 generates, using appropriate technical means (apparatus, computer program), a zero-knowledge proof (ZKP) which indicates the second digital identity, e.g., its DID, and a hash value of the passport number and proves that the first person is holder of the passport with the respective passport number without revealing the plaintext or value of the passport number and/or the signature of the passport VC 312. In practice, the ZKP, e.g., indicates a hash value H1(H(passport number)+public DID of SSI2) of the hash value of the passport number and the DID of the second digital identity, whereas H is a (cryptographic) hash function. For this, generating the ZKP comprises generating another hash value, here H1(H(passport number)+public DID of SSI2), by hashing a combination of the hash value (of the passport number) and the information, here the DID, related to the second digital identity. The ZKP is configured such that it proves that the hash value H1(H(passport number)+public DID of SSI2) is based on the passport number of the first digital identity without revealing it. For generating the ZKP, a predetermined deterministic routine can be used to enable a recipient to reproduce the same hash value H1(H(passport number)+public DID of SSI2) based on the DID and the hash value of the passport number for assessing or verifying the response, as laid out later.

In order that multiple persons or users can retrieve the DID for proving the authenticity of their response according to the proposed approach, the DID can be made publicly available. In the event that the second digital identity is public, the DID may be publicly available on a public ledger (anyway). If the second digital identity is private, its DID is inherently private. Hence, if the second digital identity was private, other information on the second digital identity can be used or the DID of the second digital identity can be made publicly available for this.

Since the passport VC and the passport number are secret, no other person may be able to reproduce the ZKP. And because the ZKP is indicative of the DID of the second digital identity, the ZKP is not suitable for responses, e.g., likes, for digital identities other than the second digital identity which makes it resistant against misuse. In embodiments, optionally other verifiable credentials, e.g., a driver license, bank card, or the like can and respective information, e.g., a driver license number, a bank account number, or the like can be used as/for the unique verifiable credential. Also, information other than the DID, e.g., a telephone number, email address, username, or the like can be used as/for information related to the second digital identity.

The ZKP is sent together with the hash value of the passport number to person 320 (his/her processing circuit). For this, the ZKP and the hash value of the passport number, e.g., are embedded in another verifiable credential 314. The ZKP and the hash value, e.g., are attributes of verifiable credential 314. In context of "likes" indicative of a social popularity of an identity, the verifiable credential 314 can be referred to as "social popularity verifiable credential". In order to indicate that the response, here the like, is addressed to the second digital identity, the verifiable credential 314 also includes data indicating who the "like" is for. Here, the data, e.g., is the name of the second digital identity that is "liked". For example, for responses including a comment, a rating, or another type of reaction, the data can also comprise the comment, the rating, or information on a type of reaction.

A recipient of the verifiable credential 314, then, can verify the authenticity of the "like" based on the ZKP and the hash value. In practice, the recipient can be an interactive platform handling the content or the person with the second digital identity. For verification, it is checked based on the ZKP whether the hash value H1(H(passport number)+public DID of SSI2) is truly based on a unique verifiable credential. Also, a hash value H2(Hash of the passport number on the VC+public DID of SSI2) is obtained by reproducing H1(H(passport number)+public DID of SSI2) based on the DID of the second digital identity and the hash value of the passport number from the verifiable credential 314 using the same deterministic routine as for generating the hash value H1(H(passport number)+public DID of SSI2). Then, it is checked whether the hash value H1(H(passport number)+public DID of SSI2) indicated by the ZKP equals the reproduced hash value H2(Hash of the passport number on the VC+public DID of SSI2).

If so, it is verified that the first digital identity has to hold a passport VC. So, it may be guaranteed that the "like" is not coming from a fake identity. In addition, it can be made sure that the same person cannot response twice or more often than desired. For this, the hash value of the passport number can be stored and compared to other hash values of passport numbers from persons submitting responses according to the proposed approach. In this way, multiple responses from the same person can be detected by their matching hash values. This, e.g., allows to consider only an accepted number of responses, e.g., only one reaction or like per person.

As mentioned before, the proof or verification according to embodiments of the present disclosure does not necessarily require a DID of the digital identity proving the authenticity of the data/response and, thus, allows a private or public digital (self-sovereign) identity to prove the authenticity. In turn, the recipient of the cryptographic proof and the hash value is enabled to claim that the "like" from a private digital identity is authentic.

Embodiments also allows a recipient of the hash value and the ZKP to prove the authenticity of the response to another entity, here e.g., a third party verification service 330. For this, the verifiable credential 314 is forwarded to the third party verification service. To this end, e.g., a non-zero-knowledge proof which includes the other verifiable credential 314 is sent to the third party verification service. Then, the third party verification service can perform the same checks, as the person with the second digital identity, i.e., reproduce and compare the hash value H1(H (passport number)+public DID of SSI2) with the ZKP, to verify the authenticity of the response or like. Since the ZKP is based on the passport VC 312 of the first digital identity, the third party verification service cannot misuse the forwarded verifiable credential for its own benefit, e.g., for faking the authenticity of an own response. On top of that, the third party verification service will not receive any personal data of the first digital identity. So, in other words, the ZKP based on a verifiable credential issued by an official and recognized entity will play the role as fingerprint which, when presented to third parties for validation, will not reveal information other than what was already revealed to the "liked" entity nor will it be possible for a third party to (re-)use this fingerprint for its own purposes.

Figure 4:
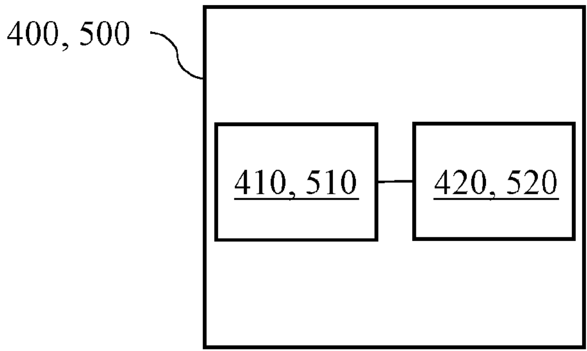
FIG. 4 illustrates a block diagram schematically illustrating embodiments of apparatuses according to the present disclosure.

Embodiments of the present disclosure can be also implemented in an apparatus, as illustrated in FIG. 4.

FIG. 4 illustrates a block diagram schematically illustrating embodiments of apparatuses according to the present disclosure.

Method 100, e.g., is performed (executed) by a respective apparatus 400 for responding to published content. An embodiment of apparatus 400 for responding to published content comprises one or more interface 410 for communicating and processing circuitry 420 configured to generate, based on one or more unique verifiable credential of a first digital identity and information related to a second digital identity, a cryptographic proof for proving that the first digital identity is holder of the one or more unique verifiable credential, wherein the cryptographic proof is indicative of the second digital identity and a hash value of the one or more unique verifiable credential. Also, the processing circuitry 420 is configured to output, using the one or more interface 410, data indicative of a response to the published content together with the cryptographic proof and the hash value.

Method 200, e.g., is performed (executed) by a respective apparatus 500 for assessing a response of a first digital identity to published content of a second digital identity. Apparatus 500 comprises one or more interface 510 for communicating and processing circuitry configured to receive, using the one or more interface 510, data indicative of the response to the published content, a hash value of one or more unique verifiable credential of the first digital identity, and a cryptographic proof for proving that the first digital identity is holder of the one or more unique verifiable credential, wherein the cryptographic proof is indicative of the second digital identity and the hash value. Further, the processing circuitry 520 is configured to assess the data based on the cryptographic proof and the hash value.

In embodiments, the one or more interface 410 and 510 may correspond to or comprise any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. In practice, embodiments of apparatus 400 and 500 communicate with each other for carrying out method 100 and 200. Accordingly, the one or more interface 410 and 510 may comprise technology for communication between apparatus 400 and 500 for communicating information according to methods 100 and 200.

In practice, the processing circuitries 420 and 520 may be implemented using one or more processing units, one or more processing devices, any means for processing, such as a processor, a computer or a programmable hardware component being operable with accordingly adapted software. In other words, the described function of the processing circuitry 420 and 520 may as well be implemented in software, which is then executed on one or more programmable hardware components. Such hardware components may comprise a general-purpose processor, a Digital Signal Processor (DSP), a micro-controller, and/or the like.

The following examples pertain to further embodiments:

(1) A method for responding to published content, the method comprising:

generating, based on one or more unique verifiable credential of a first digital identity and information related to a second digital identity, a cryptographic proof for proving that the first digital identity is holder of the one or more unique verifiable credential, wherein the cryptographic proof is indicative of the second digital identity and a hash value of the one or more unique verifiable credential; and outputting data indicative of a response to the published content together with the cryptographic proof and the hash value.

(2) The method of (1), wherein generating the cryptographic proof comprises generating another hash value by hashing a combination of the hash value and the information related to the second digital identity, and wherein the cryptographic proof is indicative of the other hash value.

(3) The method of (1) or (2), wherein the second digital identity is a self-sovereign identity relating to a public decentralized identifier, DID, wherein the information related to the second digital identity includes the public DID.

(4) The method of any one of (1) to (3), wherein the response comprises at least one of a vote, a rating, and a comment of the first digital identity on the published content.

(5) The method of any one of (1) to (4), wherein the one or more unique verifiable credential comprises at least one of a unique identification number and unique biometric information representative of a human user represented by the first digital identity.

(6) The method of any one of (1) to (5), wherein the cryptographic proof is a zero-knowledge proof.

(7) A method for assessing a response of a first digital identity to published content of a second digital identity, the method comprising:

receiving data indicative of the response to the published content;

receiving a hash value of one or more unique verifiable credential of the first digital identity;

receiving a cryptographic proof for proving that the first digital identity is holder of the one or more unique verifiable credential, wherein the cryptographic proof is indicative of the second digital identity and the hash value; and assessing the data based on the cryptographic proof and the hash value.

(8) The method of (7), wherein assessing the data comprises comparing the hash value with the cryptographic proof.

(9) The method of (7) or (8), wherein the method further comprises processing the data based on assessing the data.

(10) The method of any one of (7) to (9), wherein the cryptographic proof is indicative of a first other hash value obtained by hashing a combination of the hash value and information related to the second digital identity, and wherein assessing the data comprises:

obtaining a second other hash value by hashing the hash value and the information related to the second digital identity; and comparing the first and the second other hash value.

(11) The method of any one of (7) to (10), wherein the second digital identity is a self-sovereign identity relating to a public decentralized identifier, DID, and wherein the information includes the public DID.

(12) The method of any one of (7) to (11), wherein the method further comprises forwarding the hash value and the cryptographic proof to circuitry of a third-party verification service and requesting verification that the first digital identity is holder of the one or more unique verifiable credential.

(13) The method of any one of (7) to (12), wherein the method comprises:

storing the hash value;

receiving other data together with a further hash value obtained from one or more unique verifiable credential of a third digital identity; and assessing the other data based on a comparison of the stored hash value and the further hash value.

(14) The method of any one of (7) to (13), wherein the cryptographic proof is a zero-knowledge proof.

(15) A computer program having a program code for performing a method according to any one of (1) to (14) when the program is executed on a processor or a programmable hardware.

(16) A non-transitory machine-readable medium having stored thereon a program having a program code for performing the method of any one of (1) to (14), when the program is executed on a processor or a programmable hardware.

(17) An apparatus for responding to published content, the apparatus comprising:

one or more interface for communicating; and processing circuitry configured to:

generate, based on one or more unique verifiable credential of a first digital identity and information related to a second digital identity, a cryptographic proof for proving that the first digital identity is holder of the one or more unique verifiable credential, wherein the cryptographic proof is indicative of the second digital identity and a hash value of the one or more unique verifiable credential; and output, using the one or more interface, data indicative of a response to the published content together with the cryptographic proof and the hash value.

(18) An apparatus for assessing a response of a first digital identity to published content of a second digital identity, the apparatus comprising:

one or more interface for communicating; and processing circuitry configured to:

receive, using the one or more interface, data indicative of the response to the published content;

receive, using the one or more interface, a hash value of one or more unique verifiable credential of the first digital identity;

receive, using the one or more interface, a cryptographic proof for proving that the first digital identity is holder of the one or more unique verifiable credential, wherein the cryptographic proof is indicative of the second digital identity and the hash value; and assess the data based on the cryptographic proof and the hash value.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for responding to published content associated with a second digital identity, the method comprising:

generating, based on (i) one or more unique verifiable credential of a first digital identity associated with a response to the published content associated with the second digital identity and (ii) information related to the second digital identity associated with the published content, a cryptographic proof for proving that the first digital identity is holder of the one or more unique verifiable credential, wherein the cryptographic proof is indicative of (a) the second digital identity associated with the published content and (b) a hash value of the one or more unique verifiable credential of the first digital identity associated with the response; and outputting data indicative of the response associated with the first digital identity to the published content associated with the second digital identity together with (i) the cryptographic proof that is indicative of (a) the second digital identity associated with the published content and (b) a hash value of the one or more unique verifiable credential of the first digital identity associated with the response and (ii) the hash value of the one or more unique verifiable credential of the first digital identity associated with the response.

2. The method of claim 1, wherein generating the cryptographic proof comprises generating another hash value by hashing a combination of the hash value and the information related to the second digital identity, and wherein the cryptographic proof is indicative of the other hash value.

3. The method of claim 1, wherein the second digital identity is a self-sovereign identity relating to a public decentralized identifier, DID, and wherein the information related to the second digital identity includes the public DID.

4. The method of claim 1, wherein the response comprises at least one of a vote, a rating, and a comment of the first digital identity on the published content.

5. The method of claim 1, wherein the one or more unique verifiable credential comprises at least one of a unique identification number and unique biometric information representative of a human user represented by the first digital identity.

6. The method of claim 1, wherein the cryptographic proof is a zero-knowledge proof.

7. The method of claim 1, wherein the one or more unique verifiable credential includes a digital equivalent of an identification document issued by a governmental authority to a natural person, and the natural person defines an entity associated with the first digital identity.

8. The method of claim 1, wherein the cryptographic proof includes a zero-knowledge proof generated using a predetermined deterministic function that takes as input a combination of (i) the hash value of the one or more unique verifiable credential of the first digital identity associated with the response and (ii) a public decentralized identifier of the second digital identity associated with the published content, and the cryptographic proof indicates a resulting hash value of the combination without revealing a plaintext of the one or more unique verifiable credential of the first digital identity associated with the response.

9. A method for assessing a response associated with a first digital identity to published content associated with a second digital identity, the method comprising:

receiving data indicative of the response associated with the first digital identity to the published content associated with the second digital identity;

receiving a hash value of one or more unique verifiable credential of the first digital identity associated with the response;

receiving a cryptographic proof for proving that the first digital identity associated with the response is holder of the one or more unique verifiable credential, wherein the cryptographic proof is indicative of (a) the second digital identity associated with the published content and (b) the hash value of the one or more unique verifiable credential of the first digital identity associated with the response; and assessing the data indicative of the response associated with the first digital identity based on (i) the cryptographic proof that is indicative of (a) the second digital identity associated with the published content and (b) the hash value of the one or more unique verifiable credential of the first digital identity associated with the response and (ii) the hash value of the one or more unique verifiable credential of the first digital identity associated with the response.

10. The method of claim 9, wherein assessing the data comprises comparing the hash value with the cryptographic proof.

11. The method of claim 9, wherein the method further comprises processing the data based on assessing the data.

12. The method of claim 9, wherein the cryptographic proof is indicative of a first other hash value obtained by hashing a combination of the hash value and information related to the second digital identity, and wherein assessing the data comprises:

obtaining a second other hash value by hashing the hash value and the information related to the second digital identity; and comparing the first and the second other hash value.

13. The method of claim 9, wherein the second digital identity is a self-sovereign identity relating to a public decentralized identifier, DID.

14. The method of claim 9, wherein the method further comprises forwarding the hash value and the cryptographic proof to circuitry of a third-party verification service and requesting verification that the first digital identity is holder of the one or more unique verifiable credential.

15. The method of claim 9, wherein the method comprises:

storing the hash value;

receiving other data together with a further hash value obtained from one or more unique verifiable credential of a third digital identity; and assessing the other data based on a comparison of the stored hash value and the further hash value.

16. The method of claim 9, wherein the cryptographic proof is a zero-knowledge proof.

17. A non-transitory machine-readable medium having stored thereon a program having a program code for performing the method of claim 1, when the program is executed on a processor or a programmable hardware.

18. An apparatus for responding to published content associated with a second digital identity, the apparatus comprising:

one or more interface for communicating; and processing circuitry configured to:

generate, based on (i) one or more unique verifiable credential of a first digital identity associated with a response to the published content associated with the second digital identity and (ii) information related to the second digital identity associated with the published content, a cryptographic proof for proving that the first digital identity is holder of the one or more unique verifiable credential, wherein the cryptographic proof is indicative of (a) the second digital identity associated with the published content and (b) a hash value of the one or more unique verifiable credential of the first digital identity associated with the response; and output, using the one or more interface, data indicative of the response associated with the first digital identity to the published content associated with the second digital identity together with (i) the cryptographic proof that is indicative of (a) the second digital identity associated with the published content and (b) a hash value of the one or more unique verifiable credential of the first digital identity associated with the response and (ii) the hash value of the one or more unique verifiable credential of the first digital identity associated with the response.

19. An apparatus for assessing a response associated with a first digital identity to published content associated with a second digital identity, the apparatus comprising:

one or more interface for communicating; and processing circuitry configured to:

receive, using the one or more interface, data indicative of the response associated with the first digital identity to the published content associated with the second digital identity;

receive, using the one or more interface, a hash value of one or more unique verifiable credential of the first digital identity associated with the response;

receive, using the one or more interface, a cryptographic proof for proving that the first digital identity associated with the response is holder of the one or more unique verifiable credential, wherein the cryptographic proof is indicative of (a) the second digital identity associated with the published content and (b) the hash value of the one or more unique verifiable credential of the first digital identity associated with the response; and assess the data indicative of the response associated with the first digital identity based on (i) the cryptographic proof that is indicative of (a) the second digital identity associated with the published content and (b) the hash value of the one or more unique verifiable credential of the first digital identity associated with the response and (ii) the hash value of the one or more unique verifiable credential of the first digital identity associated with the response.

* * * * *